United States Patent [19]
Fukuo et al.

[11] Patent Number: 6,074,465
[45] Date of Patent: Jun. 13, 2000

[54] FLUORESCENT CRAYON

[75] Inventors: Hidetoshi Fukuo, Yao; Shinji Tsujio, Sakai, both of Japan

[73] Assignee: Sakura Color Products Corporation, Osaka-fu, Japan

[21] Appl. No.: 09/204,575

[22] Filed: Dec. 3, 1998

[30]   Foreign Application Priority Data

Dec. 9, 1997   [JP]   Japan .................................. 9-338391

[51] Int. Cl.[7] ................................................. C09D 13/00
[52] U.S. Cl. ...................................... 106/31.07; 106/31.09; 106/31.15
[58] Field of Search ............................. 106/31.07, 31.09, 106/31.15

[56]   References Cited

U.S. PATENT DOCUMENTS 3,846,363   11/1974   Ando et al. ............................. 523/164
5,498,280   3/1996   Fistner et al. ........................ 106/31.64

Primary Examiner—Mark L. Bell
Assistant Examiner—Veronica F. Faison
Attorney, Agent, or Firm—Baker Botts L.L.P.

[57]   ABSTRACT

There is provided a novel fluorescent crayon having the quality characteristics of high coloring power, good drawing quality, and good adhesion all in one, while overcoming the drawbacks of the conventional crayon, that is to say a fluorescent crayon comprising a solution type fluorescent coloring agent, a gelling agent, an organic solvent and a resin component.

5 Claims, No Drawings

FLUORESCENT CRAYON

FIELD OF THE INVENTION

The present invention relates to a novel fluorescent crayon.

BACKGROUND OF THE INVENTION

Heretofore known are various kinds of fluorescent crayons. Depending on the required quality characteristics, those crayons are manufactured by melt-blending a natural high-melting wax (carnauba wax, rice bran wax, etc.) or a synthetic high-melting wax (an aliphatic amide etc.) with an intermediate-melting wax (hydrogenated oil, paraffin, etc.) and a fluid oil (coconut oil, liquid paraffin, etc.) according to a suitable recipe, adding a fluorescent dye or pigment, casting the resulting composition in a predetermined mould, and cooling it to solidify in situ.

However, the conventional fluorescent crayon has the drawback of poor color development as well as the drawback that bleeding occurs on aging. Moreover, the density of the developed color is low and unless the fluorescent coloring agent is added in a large amount, no bright color can be obtained, while the use of such a large amount of the fluorescent coloring agent would result in deteriorated drawing quality and may cause a decrease in adhesion.

In addition, those fluorescent crayons have the same problems as those of the regular crayons. Thus, they are insufficient in adhesion to non-absorbent surfaces such as metal, glass, and plastic substrates and cannot be applied to drawing on those materials. Another problem is that when one touches those crayons, the crayons are ready to stain the fingers. Moreover, at high temperatures, the fluid oil component of the crayon bleeds out to detract from the stability of quality.

SUMMARY OF THE INVENTION

The present invention, therefore, has for its primary object to provide a novel fluorescent crayon which overcomes the above-mentioned disadvantages of the prior art fluorescent crayon and insures not only an excellent color development characteristic but also satisfactory drawing quality and adhesion, among other performance characteristics.

The inventors of the present invention did an intensive investigation for overcoming the above-mentioned disadvantages of the prior art crayon and succeeded in creating a novel fluorescent crayon with which the above object can be accomplished. The present invention has accordingly been developed.

The present invention, therefore, is concerned with a fluorescent crayon comprising a solution type fluorescent coloring agent, a gelling agent, an organic solvent, and a resin component.

DETAILED DESCRIPTION OF THE INVENTION

The solution type fluorescent coloring agent is not particularly restricted to any particular substances provided that it is generally soluble in various organic solvents, and the known coloring agents and commercial coloring agents of the type can be utilized. The term "solution type fluorescent coloring agent" is antithetic to the term "disperse type fluorescent coloring agent" which means a fluorescent coloring agent not soluble in organic solvents.

Generally, fluorescent coloring agents are roughly classified into the pigment color type and the synthetic resin solid solution type. The pigment color type fluorescent coloring agent shows a fluorescent color by itself and is insoluble in water. In contrast, the synthetic resin solid solution type fluorescent coloring agent is composed of a clear synthetic resin (matrix) and a fluorescent dye dissolved therein and the solution type fluorescent coloring agent for use in the present invention belongs to this type. Such synthetic resin solid solution type fluorescent coloring agents are further divided into the disperse type and the solution type according to solubility in organic solvents. The disperse type fluorescent coloring agent generally occurs in the form of powders insoluble in organic solvents and is put to use as dispersed in an organic solvent. In contrast, the solution type fluorescent coloring agent is generally soluble in organic solvents and put to use as dissolved in a suitable organic solvent. The fluorescent crayon of the present invention contains a fluorescent coloring agent of this solution type as an essential component.

The solution type fluorescent coloring agent is generally prepared by dissolving a fluorescent dye, optionally together with an ultraviolet absorber, in a synthetic resin matrix either in the course of resin production or following the production and pulverizing the resulting colored resin block, if necessary followed by further micronization. It should, however, be understood that the solution type fluorescent coloring agent is not limited to coloring agents manufactured by such a process.

All the commercially available solution type fluorescent coloring agents can be used for the purposes of the present invention. Thus, MIP-501, MIP-502, MIP-503, MIP-504, MIP-505, MIP-506, MIP-507, MIP-501C, MIP-503C, MIP-504C, MIP-505C, MIP-506C, MIP-507C, MIP-508C, etc. (all from Japan Fluorescent Chemical Co.), FM11, FM12, FM13, FM14, FM15, FM16, FM17, FM18, FM25, FM27, FM103, FM104, FM105, FM106, FM107, FM108, etc. (all from Synleich), and Yellow 31, Rose 35, Magenta 27, Brightener 22, etc. (all from Starling Industrial Colors Limited), among others, can be mentioned.

In accordance with the present invention, the solution type fluorescent coloring agent may be partially replaced with other coloring matter within the range not detracting from the effect of the former coloring agent. Such coloring matter is not particularly restricted but includes various known pigments and dyes. Among such pigments can be reckoned a variety of inorganic pigments such as titanium dioxide, red iron oxide, ultramarine blue, cobalt blue, iron yellow, iron black, titanium yellow, etc. and organic pigments such as condensed azo compounds, phthalocyanine blue, phthalocyanine green, indanthrene blue, quinacridones, diketo-pyrrolo-pyrroles, dioxazines, etc. In addition, the known extender pigments such as calcium carbonate, clay, zinc bloom, etc. can also be formulated. Further, phosphorescent pigments, synthetic mica, and metal powders can also be used. Moreover, carbon black and the like can also be formulated. Referring to dyes, oil-soluble dyes in particular can be used with advantage in the practice of the invention. As oil-soluble dyes, phthalocyanine dyes, pyrazolone dyes, nigrosine dyes, anthraquinone dyes, azo dyes, and chromium-containing metal complex dyes, whether known or commercially available, can be used.

The proportion of the solution type fluorescent coloring agent in the crayon can be judicially modified according to the kind of coloring agent and other factors but is usually about 0.1–30 weight %, preferably 1–20 weight %. If the proportion of the solution type fluorescent coloring agent is too large, the relative decreases in the amounts of the other components result in inadequate expression of the effects expected of such components, while the use of the solution type fluorescent coloring agent in too small a proportion will not provide sufficient fluorescent color development.

The gelling agent is not particularly restricted in kind but any of those substances which are used in the conventional gel crayon can be employed. In the present invention, at least one of dibenzylidenesorbitol and tribenzylidenesorbitol series compounds is used with particular advantage. Thus, at least one member selected from the group consisting of dibenzylidenesorbitol, tribenzylidenesorbitol, and their derivatives can be employed.

The dibenzylidenesorbitol derivatives mentioned above include but are not limited to compounds available upon substitution of the benzene nucleus of each benzylidene group of dibenzylidenesorbitol with a $C_{1-3}$ alkyl group in an optional position, thus including such species as [di(p-methylbenzylidene)]sorbitol, [di(m-ethylbenzylidene)]sorbitol, and [di(p-chlorobenzylidene)]sorbitol, among others. The above-mentioned tribenzylidenesorbitol derivatives include but are not limited to compounds available upon substitution of the benzene nucleus of each benzylidene group of tribenzylidenesorbitol with a $C_{1-3}$ alkyl group in an optional position, thus including such species as [tri(p-methylbenzylidene)]sorbitol, [tri(m-ethylbenzylidene)]sorbitol, and [tri(p-chlorobenzylidene)]sorbitol, among others.

The proportion of the gelling agent in the fluorescent crayon can be judiciously selected according to the kind of gelling agent but may be usually about 2–12 weight % and preferably 3–8 weight %. If the gelling agent is used in an excessive proportion, the gel will become too hard so that the coloring power of the crayon may deteriorate. If the proportion of the gelling agent is too small, gelation will not occur easily.

The organic solvent for use in the fluorescent crayon of the invention is not particularly restricted unless it interferes with dissolution of said solution type fluorescent coloring agent, and the hitherto-known organic solvents can be used. Among such known solvents, monohydric alcohols, glycols, glycol ethers, and their esters are used with advantage in the present invention. The monohydric alcohol includes but is not limited to ethanol, methanol, and isopropyl alcohol. The glycol includes but is not limited to ethylene glycol, propylene glycol, diethylene glycol, dipropylene glycol, and hexylene glycol. The glycol ether includes but is not limited to glycol methyl ethers, glycol ethyl ethers, glycol propyl ethers, and glycol butyl ethers. Among them, solvents boiling between 70° C. and 250° C. are preferred.

The proportion of the organic solvent in the fluorescent crayon of the invention can be judiciously selected in relation to the solution type fluorescent coloring agent and other components but may be usually about 20–80 weight %, preferably 30–65 weight %. If the organic solvent is excessive, gelation may hard to occur. On the other hand, if the amount of the organic solvent is too small, the other components will not be sufficiently dissolved so that no homogeneous gel may be obtained.

The resin component is not particularly restricted in kind but the various resins which are conventionally used in the gel crayon or the like can be employed. In the present invention, it is particularly advantageous to use two kinds of resins, namely a film-forming resin and an adhesion-improving resin, in combination.

The film-forming resin is not particularly restricted in kind only if it is capable of enhancing the hardness of the fluorescent crayon and forming a tough film on the substrate surface. Thus, for example, cellulosic resins such as cellulose acetate butyrate, ethylcellulose, acetylcellulose, etc. and vinyl resins such as polyvinyl butyral, polyvinyl acetate, vinyl acetate-vinyl chloride copolymer resin, vinyl acetate-ethylene copolymer resin, etc. can be used. Those resins can be used each independently or in a combination of two or more species. Among the above-mentioned resins, polyvinyl butyral resins with an acetyl content of 5% or less, a hydroxyl content of 18–27%, a butyral content of 69% or more and a degree of polymerization in the range of 300–2000 are preferred.

On the other hand, the adhesion-improving resin is not particularly restricted in kind, either, only provided that it is capable of improving adhesion to the substrate surface. Thus, for example, ketone resin, xylene resin, and amide resin can be used. The ketone resin may for example be the product of condensation between cyclohexanone and formaldehyde. The xylene resin may for example be the product of condensation between m-xylene and formalin. The amide resin may for example be a thermoplastic resin available upon polycondensation of a dimer acid and a di- or polyamine and having a molecular weight of about 4000 to 9000. Those adhesion improving resins can also be used each independently or in a combination of two or more species.

The proportion of the resin component in the fluorescent crayon should vary with different kinds of resins but may be generally about 3–40 weight % and preferably 6–35 weight %. If the resin component is excessive, the gel will become too hard so that the coloring power of the crayon may deteriorate. If the amount is too small, gelation will be hard to occur.

The formulating amounts of said film-forming resin and adhesion-improving resin can also be judiciously selected in relation to the other components but the recommended ratio of film-forming resin to adhesion-improving resin is about 1:0.1–5 by weight, preferably 1:0.2–3 by weight.

In the fluorescent crayon of the present invention, other known additives such as a colorant, filler, leveling agent, viscosity modifier, thixotropic agent, dryness imparting agent, etc. can be incorporated in suitable amounts where necessary. Moreover, a plasticizer such as diethyl phthalate, dibutyl phthalate, dioctyl phthalate, 2-ethylhexyl epoxyhexahydrophthalate, 2-ethylhexyl sebacate, tricresyl phosphate, etc. can also be incorporated in a suitable amount.

The gel strength of the fluorescent crayon of the invention can be judiciously set according to the intended use for the end product but is generally set at about 5–50 kg/cm$^2$ and preferably at 7–30 kg/cm$^2$. The gel strength can be modified by varying the kinds and formulating amounts of the organic solvent and/or gelling agent, for instance.

The method for production of the fluorescent crayon of the invention essentially comprises blending the above-mentioned components uniformly. A typical procedure comprises dissolving the film-forming resin etc. in an organic solvent, optionally dispersing a colorant thoroughly in the solution using a mill or the like, dissolving said organic solvent, adhesion-improving agent, solution type fluorescent coloring agent, etc. therein, casting the final solution in a mould having a desired profile, and cooling the contents to solidify in situ. In carrying out the above procedure, heat may be applied for dissolving the respective components. The fluorescent crayon of the invention can be manufactured by the per se known crayon manufacturing technology using the above-mentioned components.

Since the fluorescent crayon of the invention has a unique composition including a fluorescent coloring agent different from the colorants used in the conventional fluorescent crayons, not only the drawbacks of the prior art fluorescent crayon can be obviated but also excellent color development, good drawing quality, and good adhesion, among other performance characteristics, can be simultaneously obtained. Therefore, regardless of the substrate material, good drawing characteristics can be enjoyed and there is no fear of the bleeding of the image which is inevitable with the conventional fluorescent crayon.

Having the above-mentioned characteristics, the fluorescent crayon of the invention finds application in a broad range of uses as a drawing material, a marker, a coating agent, or the like with broad substrate compatibility.

EXAMPLES

The following examples and comparative examples illustrate the outstanding features of the present invention in further detail.

Example 1

To 22 parts by weight of propylene glycol monomethyl ether was added 15 parts by weight of polyvinyl butyral resin [Denka Butyral 2000L; Denki Kagaku Kogyo]. After dissolution, 10 parts by weight of pigment (titanium dioxide) was added and thoroughly dispersed in a mill. Thereafter, 28 parts by weight of dipropylene glycol monomethyl ether and 3 parts by weight of dibutyl phthalate were added. While this mixture was stirred at 130° C., 6 parts by weight of ketone resin [HiLac 111; Hitachi Kasei] and 10 parts by weight of solution type fluorescent coloring agent [MIP-505C; Japan Fluorescent Chemical] were gradually added. The mixture was incubated at the above temperature for a while to give a homogeneous solution. This solution was cast in a mould and cooled to solidify in situ and the solid product was taken out.

Example 2

To 20 parts by weight of propylene glycol monomethyl ether was added 10 parts by weight of cellulose acetate butyrate ["CAB 381-1/2"; Eastman Chemical]. After dissolution, 6 parts by weight of pigment (titanium dioxide) was added and thoroughly dispersed in a mill. Then, 20 parts by weight of dipropylene glycol monomethyl ether, 20 parts by weight of ethanol, 3 parts by weight of propylene glycol, and 3 parts by weight of N-methyl-2-pyrrolidone were added. Under heating and stirring at 90° C., 5 parts by weight of xylene resin [Nikanol HP-120; Mitsubishi Gas Chemical] and 14 parts by weight of solution type fluorescent coloring agent [Flare 410 Series Magenta 37; Starling Industrial Colors Limited] were added and the mixture was incubated at the above temperature to give a homogeneous solution. Then, 5 parts by weight of tribenzylidenesorbitol was added and thoroughly dissolved. The resulting solution was cast in a mould and cooled to solidify in situ and the solid product was taken out.

Example 3

To 60 parts by weight of propylene glycol monomethyl ether acetate was added 10 parts by weight of polyvinyl butyral resin [Denka Butyral 2000L; Denki Kagaku Kogyo]. After dissolution, 2 parts by weight of pigment (phthalocyanine blue) was added to the resulting solution and dispersed thoroughly in a mill. Thereafter, 1 part by weight of dibutyl phthalate and 10 parts by weight of ketone resin [HiLac 111; Hitachi Kasei] were added. Then, 12 parts by weight of solution type fluorescent coloring agent [MIP-505C; Japan Fluorescent Chemical] was gradually added and the mixture was incubated at 130° C. with stirring to give a homogeneous solution. Then, 5 parts by weight of dibenzylidenesorbitol was added and thoroughly dissolved. The resulting solution was cast in a mould and cooled to solidify in situ and the solid product was taken out.

Example 4

To 23 parts by weight of propylene glycol monomethyl ether was added 12 parts by weight of polyvinyl butyral resin [Denka Butyral 2000L; Denki Kagaku Kogyo]. After dissolution, 3 parts by weight of pigment (phthalocyanine blue) and 5 parts by weight of pigment (titanium dioxide) were added to the resulting solution and thoroughly dispersed in a mill. Then, 18 parts by weight of dipropylene glycol monomethyl ether, 4 parts by weight of dibutyl phthalate, and 7 parts by weight of ethanol were added. While the mixture was stirred at 130° C., 5 parts by weight of ketone resin [HiLac 111; Hitachi Kasei] was added. Then, 16 parts by weight of solution type fluorescent coloring agent [Flare 410 Series Rose 35; Starling Industrial Colors Limited] was gradually added and the mixture was incubated at the above temperature to give a homogeneous solution. Then, 6 parts by weight of dibenzylidenesorbitol was added and thoroughly dissolved. The resulting solution was cast in a mould and cooled to solidify in situ and the solid product was taken out.

Comparative Example 1

Using a disperse type fluorescent coloring agent [810 Series Yellow 27; Starling Industrial Colors Limited] in lieu of the solution type fluorescent coloring agent used in Example 1, the procedure of Example 1 was otherwise repeated to provide a solid product.

Comparative Example 2

Except that the polyvinyl butyral resin used as a film-forming resin in Example 1 was not formulated, the procedure of Example 1 was repeated to provide a solid product.

Comparative Example 3

Except that the ketone resin used as an adhesion-improving resin in Example 1 was not formulated, the procedure of Example 1 was repeated. As a result, no solid product could be obtained.

Test Example 1

The solid products (crayons) obtained in Examples 1–4 and Comparative Examples 1–2 were evaluated for drawing quality and other characteristics. The evaluation of each quality parameter was carried out as follows.

(1) Drawing quality

The sensory evaluation of the drawings made with a test fluorescent crayon directly on an iron sheet and a plastic board. The evaluation scale: A little resistance felt in drawing (no drag); B some resistance felt in drawing (some drag); C drawing impossible.

(2) Adhesion

A cellophane tape is applied over markings (crayoned area) made with a test fluorescent crayon on an iron sheet and after the tape was peeled off, the degree of adhesion of the crayon to the cellophane tape was visually evaluated. The evaluation scale: A no exfoliation, B partial exfoliation, C total exfoliation.

(3) Gel hardness

This parameter was measured with a semiconductor pressure transducer [PMS-5 Model 10H; Toyota Koki].

(4) Coloring power

The fluorescent coloration characteristic was visually evaluated. The evaluation scale: A brilliant fluorescence; B weak fluorescence; C no fluorescence.

TABLE 1

|  | Drawing quality | Adhesion | Gel hardness (kg/cm$^2$) | Coloring power |
|---|---|---|---|---|
| Example 1 | A | A | 15.2 | A |
| Example 2 | A | A | 24.5 | A |
| Example 3 | A | A | 13.6 | A |
| Example 4 | A | A | 16.0 | A |
| Comparative Example 1 | C | B | 35.9 | C |
| Comparative Example 2 | B | C | 13.4 | B |

It can be seen from Table 1, for instance, that the fluorescent crayon of the invention is outstanding in all the respects of drawing quality, adhesion, and coloring power.

What is claimed is:

1. A fluorescent crayon comprising a solution type fluorescent coloring agent, a gelling agent, an organic solvent, and a resin component.

2. A fluorescent crayon according to claim 1 wherein the gelling agent is at least one member selected from the group consisting of dibenzylidenesorbitol compounds and tribenzylidenesorbitol compounds.

3. A fluorescent crayon according to claim 1 wherein the organic solvent is at least one member selected from the group consisting of monohydric alcohols, glycols, glycol ethers, and esters thereof.

4. A fluorescent crayon according to claim 1 wherein the resin component comprises at least one member selected from the group consisting of cellulosic resin and vinyl resin and at least one member selected from the group consisting of ketone resin, xylene resin and amide resin.

5. A crayon according to any of claims 1–4 wherein the solution type fluorescent coloring agent accounts for 0.1–30 weight % of the fluorescent crayon.

* * * * *

UNITED STATES PATENT AND TRADEMARK OFFICE
CERTIFICATE OF CORRECTION

PATENT NO. : 6,074,465

DATED : June 13, 2000

INVENTOR(S) : Fukuo et al.

It is certified that error appears in the above-identified patent and that said Letters Patent is hereby corrected as shown below:

Title Page, Item [73] Assignee: "Osaka-fu," should read -- Osaka, --;

Column 3, line 33: "the gelling agent" should read -- the gelling agent --; and "gellation" should read -- gellation --;

Column 4, line 22: "polyamine" should read -- polyamine --; and "molecular weight" should read -- molecular weight --;

Column 4, line 44: "epoxyhexahydrophthalate, 2-ethylhexyl sebacate, tricresyl" should read -- epoxyhexahydrophthalate, 2-ethylhexyl sebacate, tricresyl --.

Signed and Sealed this

Twenty-second Day of May, 2001

*Attest:*

NICHOLAS P. GODICI

*Attesting Officer*  *Acting Director of the United States Patent and Trademark Office*